G. W. JACQUES.
BACK GAUGE.
APPLICATION FILED AUG. 23, 1919.

1,421,483.

Patented July 4, 1922.

WITNESSES:
Adrian de May
L. E. Fischer

INVENTOR
George W. Jacques.
BY
ATTORNEY

UNITED STATES PATENT OFFICE.

GEORGE W. JACQUES, OF STRATFORD, CONNECTICUT, ASSIGNOR TO THE SINGER MANUFACTURING COMPANY, A CORPORATION OF NEW JERSEY.

BACK GAUGE.

1,421,483.  Specification of Letters Patent.  Patented July 4, 1922.

Application filed August 23, 1919. Serial No. 319,401.

*To all whom it may concern:*

Be it known that I, GEORGE W. JACQUES, a citizen of the United States, residing at Stratford, in the county of Fairfield and State of Connecticut, have invented certain new and useful Improvements in Back Gauges, of which the following is a specification, reference being had therein to the accompanying drawings.

This invention seeks to provide a novel edge gauge, and while not regarded as in any sense restricted thereto, has been more particularly designed for use in duplex eyeleting and hook setting machines where fasteners are inserted simultaneously in a plurality of superposed sheets of material guided simultaneously by the gauge while passing through the machine.

In machines of this character it has been found difficult to adjust the position of the edge gauge relative to the operating instrumentalities, the various parts such as punch and set mechanisms and the raceways for the fasteners rendering the gauge and its mounting as heretofore constructed very inaccessible to the use of ordinary tools.

This invention provides a construction by which such adjustment to determine the distance from the edge of the work that the mechanisms shall operate, may be readily affected by the use of a simple tool such as a screw driver and which is never inaccessible because of the presence or action of other parts of the machine.

It further provides such a mechanism whereby the gauge is held securely at any adjusted position without the use of separate locking devices of any description.

It also provides means carried by the gauge for stripping the work from the operating mechanisms.

For a more complete understanding of this invention reference may be had to accompanying drawings in which,—

Figure 1:
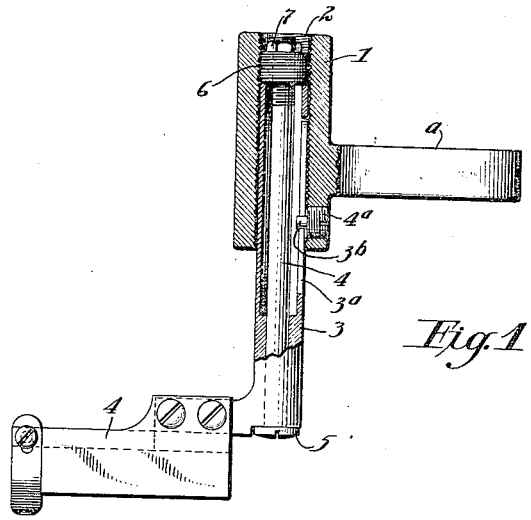
Fig. 1 represents a plan view, partly broken away, of the gauge and its immediate mountings.

In these figures $a$ represents a bracket adapted to be fastened to the frame of the machine, and which is provided with a sleeve portion 1 having a screw threaded bore 2 therein adapted to slidably carry a stem 3 fastened to the gauge 4 at one end thereof. As shown, also, bracket $a$ has other sleeve portions $b$ and $c$ intended to support other parts of the machine which are not shown here as they form no part of the invention. Stem 3 is shown as hollow, and journaled therein is a rod 4 having a slotted head 5 at its forward end accessible to a screw driver from the front of the gauge adjacent its work engaging face. Projecting beyond the stem 3 rearwardly rod 4 carries a screw threaded collar 6 adapted to engage the threads of bore 2 and which is made fast on the end of rod 4 by a screw engagement therewith, and by means of a lock nut 7. Stem 3 is longitudinally slotted as shown at $3^a$ and a screw $4^a$ having a projecting pin $3^b$ is seated in a suitable opening in the sleeve 1 so that pin $3^b$ may ride within the slot $3^a$ to prevent relative rotation of stem 3 and bracket $a$.

Figure 2:
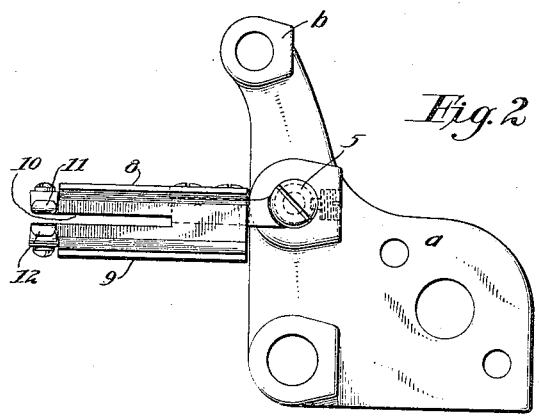
Fig. 2 represents a front elevation.
Figure 3:
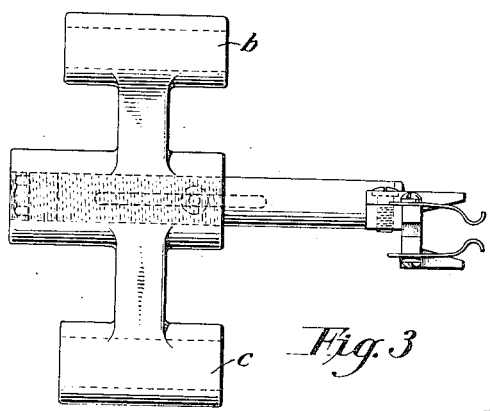
Fig. 3 is an end elevation looking in a direction opposite to the feed of the work.

Gauge 4 is substantially U-shaped in cross section, being provided with upper and lower work guiding flanges 8 and 9. Between these flanges a slot 10 is provided which is designed to receive the anvil holding member projecting through from the rear of the gage and into cooperative relation with the punch and set mechanisms. This is also old and is not shown in further detail. The direction of feed on Fig. 2 is from right to left and at the ends of the flanges 8 and 9 at the left are shown spring fingers 11 and 12 made fast to the gauge which serve as strippers on work passing along the gauge between its flanges.

Operation: In operation, the work is fed between the flanges 8 and 9 and the stripper fingers 11 and 12. To adjust the gauge to determine the distance from the edge of the work that the fasteners shall be set, the operator inserts a screw driver in the slot of head 5 and turns the rod 4. This rotates the collar 6 and adjusts the stem in and out within the sleeve 1. The head 5 is always accessible to the screw driver, none of the operative mechanisms of the machine projecting in front thereof. The spring fingers 11 and 12 serve to strip the material from the punch and set mechanisms or other working instrumentalities of the machine.

Having thus described one embodiment of this invention, though it is evident that many changes might be made therein without departing from its spirit or scope what is claimed as new is,—

1. In combination, an edge-gauge, a hollow stem projecting therefrom, a hollow internally threaded support within which said stem is slidingly mounted, and means permitting adjustment of the operative position of the edge-gauge comprising an adjusting screw journaled in said stem and coacting with said internally threaded support.

2. In combination, an edge-gauge, a hollow stem projecting therefrom, a hollow internally threaded support within which said steam is slidingly mounted, means for preventing relative rotation between said stem and support, and means permitting adjustment of the operative position of the edge-gauge comprising an adjusting screw journaled in said stem and coacting with said internally threaded support.

3. In combination, an edge-gauge, a hollow stem projecting rearwardly therefrom at one end thereof, a support having a threaded bore in which said stem is slidable, a gauge-adjusting rod journaled in said stem, and a threaded member carried by said rod and having its threads meshing with the threads of said bore.

4. In combination, an edge-gauge, a hollow stem projecting rearward therefrom at one end thereof, a support having a threaded bore in which said stem is slidable, a rod journaled longitudinally in said stem and accessible to a tool for turning the same at the forward end thereof, a threaded member fixed to the rear end of said rod and beyond the end of said stem and having its threads meshing with the threads of said bore, and means to prevent rotation of said stem in said bore.

In testimony whereof, I have signed my name to this specification.

GEORGE W. JACQUES.